United States Patent [19]
Woods

[11] 4,278,969
[45] Jul. 14, 1981

[54] DRIVER WARNING SYSTEM
[75] Inventor: Richard E. Woods, Markle, Ind.
[73] Assignee: Reli Corporation, Markle, Ind.
[21] Appl. No.: 39,274
[22] Filed: May 16, 1979

Related U.S. Application Data
[63] Continuation-in-part of Ser. No. 828,529, Aug. 29, 1977, abandoned.

[51] Int. Cl.³ .................................................. G08B 19/00
[52] U.S. Cl. .................................. 340/576; 180/171; 180/272; 250/231 SE; 340/52 F; 340/62
[58] Field of Search ................ 340/52 R, 52 F, 53, 340/62, 576, 671, 672; 250/231 SE; 180/170, 171, 272

[56] References Cited

U.S. PATENT DOCUMENTS

| | | | |
|---|---|---|---|
| 2,304,546 | 12/1942 | Cox | 188/110 |
| 3,106,981 | 10/1963 | Chakiris | 340/53 X |
| 3,146,432 | 8/1964 | Johnson | 340/670 X |
| 3,222,639 | 12/1965 | Kayser, Jr. | 340/52 |
| 3,222,640 | 12/1965 | Wurst | 340/53 |
| 3,436,637 | 4/1969 | Ehret | 318/449 |
| 3,559,065 | 1/1971 | Grundy | 250/231 SE X |
| 3,559,205 | 1/1971 | Colby | 340/671 X |
| 3,594,772 | 7/1971 | Setser | 180/99 |
| 3,631,446 | 12/1971 | Setser | 180/99 |
| 3,654,599 | 4/1972 | Sepper | 340/52 |
| 3,794,969 | 2/1974 | Klopfenstein et al. | 340/52 R |
| 3,877,541 | 4/1975 | Takeuchi et al. | 180/99 |
| 3,944,969 | 3/1976 | Arai et al. | 340/52 F |
| 3,980,999 | 9/1976 | Nishioka et al. | 340/52 R X |
| 3,997,869 | 12/1976 | Mayer | 340/62 |
| 4,017,843 | 4/1977 | Yanagishima | 340/52 R X |
| 4,031,527 | 6/1977 | Yanagishima et al. | 340/52 F X |
| 4,106,584 | 8/1978 | Matsubara | 180/170 X |

*Primary Examiner*—John W. Caldwell, Sr.
*Assistant Examiner*—Joseph E. Nowicki

[57] ABSTRACT

A driver warning system has a steering sensor with a light source and photocell mounted on the steering column and directing a light beam towards a strip having alternate bands of reflective and non-reflective material formed thereon. A circuit coupled to the photocell is provided for sensing the transition between a reflected beam and a non-reflected beam. The beam is radiated at a frequency to which the circuit is sensitive so that ambient light will not cause a false signal. A transducer is provided for sensing the vehicle speed and providing a corresponding voltage. The warning system is inoperative below a minimum vehicle speed. Alarm circuitry is actuated upon the absence of a transition for a predetermined time period, dependent on vehicle speed. Both the predetermined time period between transitions to trigger the alarm and the vehicle speed at which the system alarm is operative are adjustable with the predetermined time period between transitions varying with vehicle speed. The alarm is also actuated when the vehicle speed exceeds an adjustable level.

15 Claims, 8 Drawing Figures

DRIVER WARNING SYSTEM

RELATED APPLICATIONS

This is a continuation-in-part of my application entitled "Driver Warning System", Ser. No. 828,529, filed Aug. 29, 1977 abandoned.

BACKGROUND OF THE INVENTION

1. Field of the Invention

This invention is in the field of vehicle steering and speed sensitive apparatus to detect a lack of driver alertness and emit a warning thereupon, and to signify vehicle speeds over a preset speed.

2. Description of the Prior Art

Numerous systems are available which sense vehicle steering corrections during a given time period as an indication of driver alertness. If the corrections fall below a predetermined number in the given time period, a driver warning system is emitted to bring to the driver attention a reduction in his alertness. The alarm systems frequently are sounds or buzzers which would arouse a sleepy or preoccupied driver condition. It has been shown that in normal driving patterns, the steering wheel is corrected a given number of times during any predetermined time period. It has also been shown that when the corrections fall below the predetermined number, the driver is usually inattentive due to fatigue, preoccupation with other matters, or other inability. An audible driver warning system during such conditions has been shown to be effective to arouse the drive to a state of alertness to prevent a vehicle accident. Such systems have been coupled with vehicle speed sensing devices which make them inoperative below a certain vehicle speed so that when the vehicle is parked or moving at a relatively slow speed, the audible alarm will not be sounded even though the necessary steering corrections are not made within the given time period. However, such systems ordinarily require physical contact between two steering members to sense the steering corrections, or require connections outside of the operator compartment such as in the engine compartment to sense vehicle speed. Also, such systems ordinarily require extensive installation and resultant costs and due to their construction can become misaligned, require frequent repair due to the manner of their sensing functions, and the attachment to the existing vehicle hardware, with resultant added equipment costs, installation costs, and maintenance costs. Further, such systems do not provide an inverse relation between vehicle speed and the time period between steering corrections to cause the alarm to be operative. For these and other reasons, these systems have not found general usage in motor vehicles.

SUMMARY OF THE INVENTION

A driver warning system is provided wherein incremental movement of a steering wheel is sensed by placing on a circumferential segment of the steering wheel hub adjacent the steering column a strip of tape having alternate reflective and non-reflective bands. The strip may be applied by simply having a self-adhesive backing thereon. Circuitry is provided to apply a two hundred Hz signal to an LED (light emitting diode) which is mounted on the steering column and superposed the strip and emits a beam angularly incident to the strip. A photo-Darlington transistor is mounted in circumferentially spaced relation to the diode and receives the reflection of the diode beam when it is incident on a reflective band of the strip but receives no reflection when the beam is incident on a non-reflective band. The photo-transistor is capacitively coupled to sensing circuitry which emits a signal whenever the beam goes from a reflective to a non-reflective band or from a non-reflective to a reflective band, thereby indicating a steering wheel movement. A capacitor is charged from a positive voltage source, which is coupled to a vehicle speed transducer which is mounted between the speedometer cable and the speedometer needle in the driver compartment and which converts the cable rotation to a DC voltage. The source is coupled through a potentiometer to the DC voltage and when the voltage corresponds to a speed below the predetermined minimum required for system operation, circuitry is provided for grounding the source and the capacitor will not charge. A second LED is coupled in parallel with the source and when the source is not grounded, the second LED, which is mounted in the operator compartment, will be illuminated indicating to the operator that the minimum speed has been reached.

Every time that the reflected radiant beam from the steering sensor LED goes through a transition from a reflected portion to a non-reflecting portion on the strip, a signal is generated which causes circuitry to ground the positive plate of the capacitor thus discharging the capacitor. Further, circuitry is provided for charging the positive plate of the capacitor inversely with vehicle speed so that as the vehicle increases in speed more steering corrections are needed to maintain the alarm inoperative. The positive plate of the capacitor is connected to a warning circuit and when it reaches a predetermined voltage, which is compared in a differential amplifier with an adjustable voltage, and when the adjustable voltage is exceeded, an alarm will sound to alert the operator. A test switch is provided which connects the positive terminal of the differential amplifier to a positive voltage which will cause the alarm to sound regardless of the adjustment position to the other input to the amplifier.

In an alternate embodiment, the 200 Hz signal to the LED is not utilized. Further, circuitry is provided to sound the alarm when an operator adjustable preset speed is exceeded by the vehicle speed. Still further, the test circuit comprises an operator actuated switch which, when closed, will simulate a vehicle speed of approximately 55 miles per hour even though the vehicle is stationary. Also, circuitry is provided to defeat a cruise control during alarm conditions.

Thus, a warning system is provided which is relatively economical to produce, install, and maintain since all of the components are in the driver compartment. There is no physical contact between moving parts in the steering sensing circuit and standard solid state components are used throughout.

It is therefore an object of this invention to provide a driver warning system of economical manufacture, installation, and maintenance.

It is an object of this invention to provide in the device of the previous object a system wherein a reflected light beam is used to sense steering wheel movement.

It is an object of this invention to provide a system of the previous invention wherein the driver warning system will operate only above a predetermined vehicle speed.

A further object of this invention is to provide a system of the previous objects wherein all the components are located in the driver compartment.

Another object is to provide a driver warning system wherein steering corrections and vehicle speed are monitored and provides a warning signal which varies with steering correction frequency and vehicle speed.

It is an object of this invention to provide circuitry for actuating the alarm of the previous objects when the vehicle speed exceeds a predetermined operator adjustable speed.

A further object is to provide in the system of the previous objects an operator acutated test circuit which simulates a predetermined vehicle speed even though the vehicle is stationary.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENTS

Figure 1:
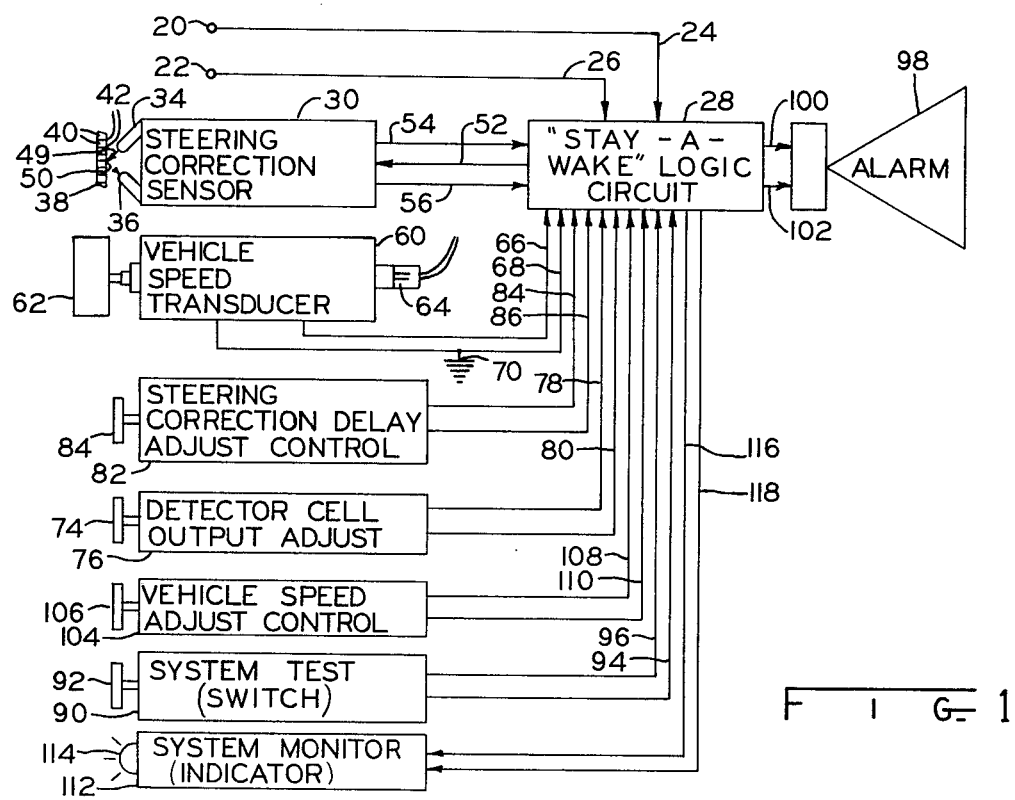
FIG. 1 is a block diagram of a preferred embodiment of this invention.
Figure 2:
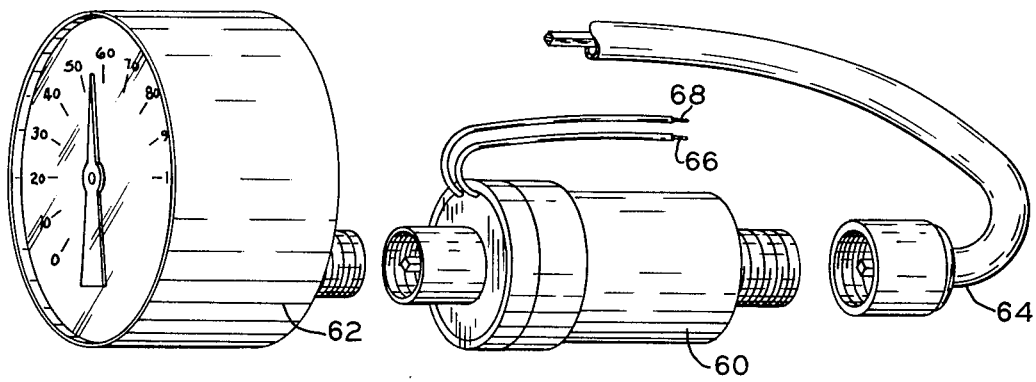
FIG. 2 is a partial, perspective, exploded view of the vehicle speed transducer of the embodiment of FIG. 1.
Figure 3:
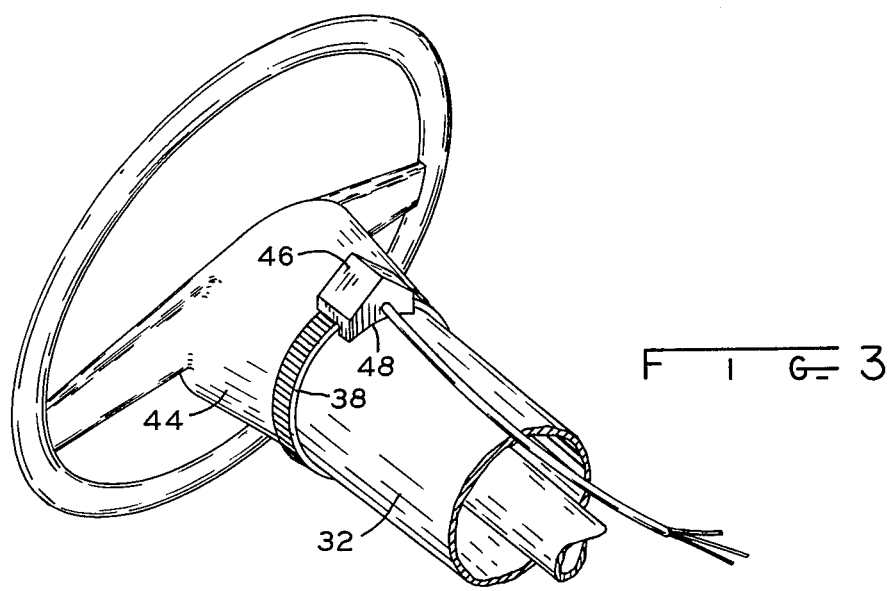
FIG. 3 is a partial, perspective view of the steering sensing mechanism of the embodiment of FIG. 1.
Figure 4:
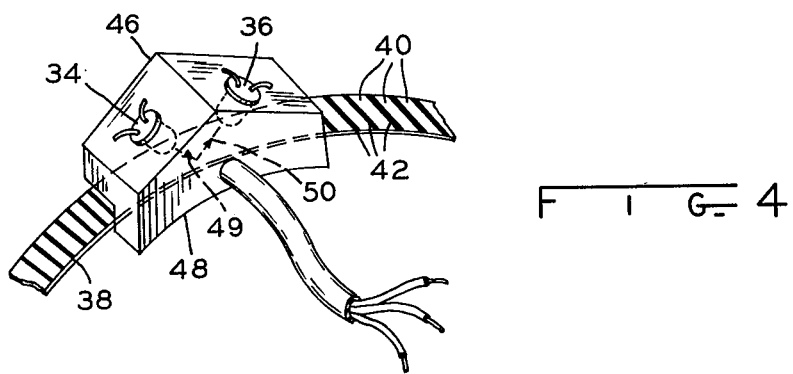
FIG. 4 is an enlarged partial view in perspective of the reflected beam and banded strip used in the speed sensing mechanism of FIG. 3.

Referring to FIG. 1 of the drawings, wherein a block diagram of the embodiment of FIG. 1 is shown, a 12 volt DC power supply, typically obtained from the vehicle battery, is applied terminals 20 and 22 and coupled through lines 24 and 26 respectively to logic circuit 28. A steering correction sensor 30 mounted to steering column 32, FIG. 3, has an LED (light emitting diode) 34 and a photo-Darlington cell 36 mounted thereto. A banded strip 38 having reflective bands 40 alternately placed with non-reflective bands 42 is affixed, as by an adhesive backing, to steering hub 44. Housing 46 for sensor 30 has an arcuate base 48 which conforms to the curvature of column 32 and is affixed thereto as with adhesive or metal tapping screws, not shown. Housing 46 overhangs strip 38 and LED 34 is positioned and held on housing 46 so that LED beam 48 is angularly directed towards strip 38 and cell 36 is angularly supported in housing 46 to receive reflected beam 50 from strip 38. Sensor 30 is coupled to circuit 28 by line 52 which supplies a 200 hz signal for driving LED 34, line 54 for coupling LED 34 return to circuit 28, and line 56 for coupling cell 36 return to circuit 28.

Vehicle speed transducer 60 is coupled between speedometer 62 and speedometer cable 63 and is a permanent magnet DC small generator which generates a proportional DC voltage corresponding to indicated speedometer on lines 66 and 68 which are coupled to circuit 28. Line 68 is grounded at 70. Such generators are commercially available with one such generator being available from Space Kom, 212 East Gutierrez Street, Santa Barbara, Calif. 93101, model numbers G7, G8 or G9. Transducer 60 in assembled relation is rotationally driven by cable 64 and rotationally drives speedometer 62.

Figure 5:
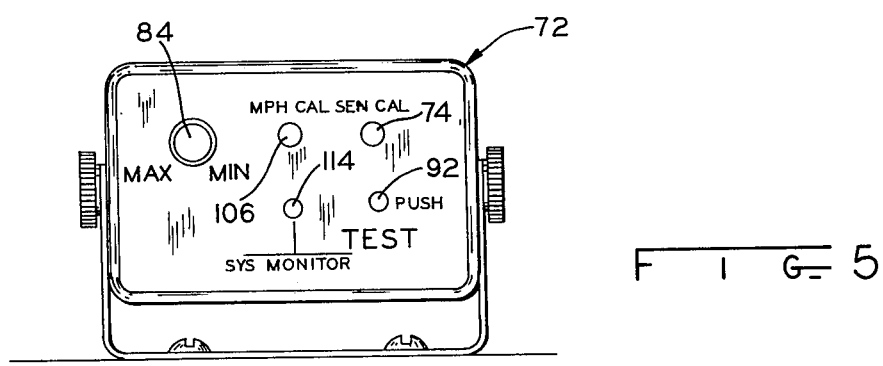
FIG. 5 is an enlarged view of the console mounted in the vehicle operator compartment for the embodiment of FIG. 1.

Referring now to FIGS. 1 and 5, operator adjust controls, test switch, and system monitor indicator are shown. A console 72 is mounted in the vehicle operator compartment conveniently accessible to the operator. Console 72 has a rotatable knob 74 mounted in detector cell output adjust circuit 76 which adjusts the Darlington-photocell output through lines 78 and 80 to circuit 28. This adjustment controls the voltage level to circuit 28 for proper system function and can be adjusted to accommodate the variables encountered for proper operation in the particular vehicle and mounting configuration thus insuring proper operation of circuit 28 under a wide variety of conditions. A steering correction delay adjust 82 having a rotatable knob 84 adjusts the amount of delay between steering corrections before an alarm is sounded. Therefore, under certain driving conditions, such as long free-way trips, it may be desirable to increase the delay before an alarm is sounded since on long straight highways, typically fewer corrections are required. Adjust circuit 82 is coupled to circuit 28 by lines 84 and 86. Also mounted in console 72 is a system test circuit 90 having a button 92 which when depressed by the operator will cause an alarm, later described, to sound if the system is operative. Switch 90 is coupled through lines 94 and 96 to circuit 28. Circuit 28 drives an alarm 98 under alarm conditions through lines 100 and 102. Alarm 98 is an audible alarm having a distinctive operator alert frequency, commercially available and well known to the art.

Also mounted in console 72 is a vehicle speed adjust control 104 having rotatable knob 106 which operates to vary the speed at which circuit 28 is enabled. At relatively low speeds, those speeds below which circuit 28 is disabled, steering corrections are less frequent and driver alert requirements are typically lessened since at these low speeds, which would include parking, standing at traffic signals, and driving in heavy traffic, driver alertness is required by relatively frequent traffic occurrences. Control 104 is coupled to circuit 28 through lines 108 and 110. Also mounted in console 72, is a system monitor indicator 112 having visual indicator 114 which is illuminated when the vehicle speed is above that which enables circuit 28 to indicate to the operator that the alert system is operative. If the operator desires alert system operation but had previously set the speed at which the circuit comes into operation, or is enabled, at a higher or lower setting than currently desired, the operator may operate the vehicle at the speed at which he desires circuit 28 to be enabled and then adjust knob 106 until light 114 is just illuminated, thus insuring operation at that and higher speeds. Indicator 112 is coupled to circuit 28 by lines 116 and 118.

Figure 6:
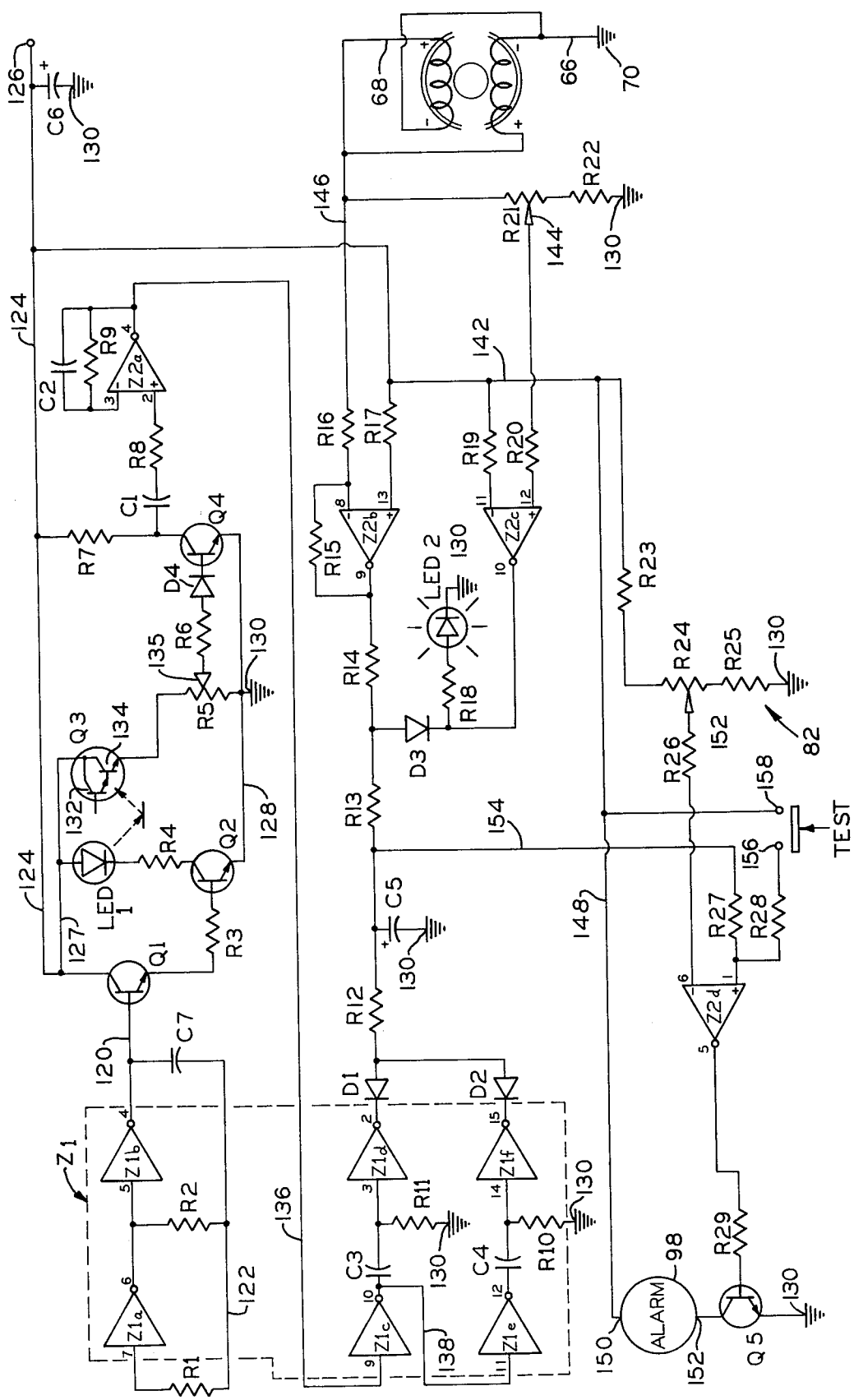
FIG. 6 is a schematic, partially block diagram of the preferred embodiment of FIG. 1.

Referring now to the circuit diagram of FIG. 6, two sections of a hex inverter IC (integrated circuit) Z1a and Z1b along with resistors R1, R2, and capacitors C7 are connected to form a 200 Hz free running multivibrator which is coupled by line 120 to the base of transistor Q1. The IC hex inverter Z1 is commercially available and is commercially obtainable and having a part number 4049. The other four sections Z1c, Z1d, Z1e, and Z1f of hex inverter Z1, are connected to form a switching circuit, later described. Resistance R1 is connected between pin 7 of circuit Z1 and line 122 resistance R2 has a common connection at one terminal to pins 5 and 6 of circuit Z1 and connected to line 122 at the other terminal, and capacitor C7 is connected between pin 4 of circuit Z1 and line 122.

The collector of transistor Q1 is connected to line 124, which is connected to a 12 volt source terminal 126 of the vehicle power supply, and line 126 which is coupled to the anode of LED 1, a light emitting diode. A filter capacitor C6 is coupled between line 124 and ground 130. The emitter of transistor Q1 is connected through current limiting resistance R3 to the base of switching transistor Q2 which has its collector coupled through current limiting resistor R4 to the cathode of LED 1 and its emitter coupled through line 128 which is grounded at 130. A photo-Darlington cell Q3 having transistors 132 and 134 coupled in Darlington configuration, has a common connection between the collectors of transistors 132 and 134 connected to line 126 and the emitter of transistor 134 coupled through potentiometer R5 to line 128. Wiper 135, which is movable upwardly and downwardly by knob 74, of potentiometer R5 is coupled through current limiting resistance R6 to the anode of diode D4 which has its cathode coupled to the base of transistor Q4, the emitter of which is coupled to line 128. A resistance R7 is coupled between line 124 and the collector of transistor Q4 which is also coupled by capacitor C1 to one terminal of resistor R8, the other terminal of which is coupled to one section Z2a of an IC quad-differential amplifier Z2, which has the other sections Z2b, Z2c, and Z2d coupled in the circuit as described below. IC quad differential amplifier Z2 is commercially available from MOS and has part number LM3900.

The other terminal resistor R8 is connected to pin 2 of Z2, which is the positive input to differential amplifier section Z2a, while resistor R9 and capacitor C2 are connected in parallel between pins 3 and 4 of the Z2 IC. Pin 3 is the negative input while pin 4 is the output to section Z2a.

Pin 4 of section Z2a is coupled through line 136 to pin 9 of IC hexinverter Z1 which is the input to section Z1c. Capacitor C3 is coupled between pins 10 and 3 of IC hex inverter Z1, with pins 3 and 2 being respectively the input and output of section Z1d. Pin 10 of Z1 is also coupled by line 138 to pin 11 which is the input to section Z1e, and capacitor C4 is coupled between pin 12 the output of section Z1e and pin 14 the input of section Z1f. Resistor R10 is coupled between pin 14 and ground 130. Resistor R11 is coupled between pin 3 and ground 130. Pins 2 and 15, respectively the outputs of sections Z1d and Z1f, are coupled respectively to the cathodes of diodes D1 and D2. The anodes of diodes D1 and D2 have a common connection to one terminal of current limiting resistor R12, the other terminal of which is connected to the positive plate of capacitor C5 which has its negative plate connected to ground 130. Resistor R13 has one terminal connected to the positive plate of capacitor C5 and the other terminal connected one terminal of resistor R14 which has its other terminal connected to the output of differential amplifier Z2b, which is pin 9 of quad amplifier Z2. Diode D3 has its anode connected between resistors R13 and R14 and its cathode connected to one terminal of resistor R18, the other terminal of which is connected to the anode of LED 2 which has its cathode connected to ground 130. The cathode of diode D3 is also connected to the output of section Z2c which is pin 10 of IC quad differential amplifier Z2. Resistor R19 has one terminal connected to the negative input of section Z2c, pin 11 of amplifier Z2, the other terminal of resistor R19 being connected to line 142. Resistor R20 has one terminal connected to the positive input to section Z2c, pin 12 of amplifier Z2, and the other terminal connected to wiper 144 of potentiometer R21.

Resistor R15 is coupled between the negative input and output of section Z2b, respectively pins 8 and 9 of amplifier Z2, resistor R16 is connected between the negative input to section Z2b, pin 8 of amplifier Z2, and the other terminal connected to 12 volt line 124 and line 142. Resistor R21 has one terminal connected to line 146, and the other terminal connected through resistor R22 to ground 130.

Line 148 couples line 142 to one terminal 150 of alarm 98 which has terminal 151 connected to the collector of transistor Q5 which has its emitter connected to ground 130. The base of transistor Q5 is connected through resistor R29 to the output of differential amplifier section Z2d, pin 5 of quad amplifier Z2 Z2. The negative input to section Z2d, pin 6 of quad amplifier Z2, is connected through resistor R26 to wiper 152 of potentiometer R24. The positive input to section Z2d, pin 1 of quad amplifier Z2, is coupled to respective first terminals of R27 and R28, the other terminal of R27 being coupled through line 154 to the positive plate of capacitor C5. The other terminal of resistor R28 is connected to terminal 156 of push button test switch Sw1 which has a second terminal 158 coupled to line 148.

Resistance R25 is connected between ground 130 and one terminal of potentiometer R24, the other terminal of which is connected through resistance R23 to lines 142 and 124 and the 12 volt terminal 126. Rotation of knob 84 moves wiper 152 along potentiometer R24 to provide a variable voltage to pin 6 of section Z2d and thus vary, as will become apparent, the delay time between steering sensor connections before alarm 98 is sounded.

In operation of the circuit of FIG. 6, a 200 Hz signal is supplied to the base of transistor Z1. LED 1 focuses a spot of red light on strip 38. If a non-reflective band 42 is in the path of LED beam 49, no reflection is received by photo transistor Q3. If a reflective band 40 is in the path of LED beam 49, a reflection 50 is received by photo transistor Q3 which provides a voltage across potentiometer R5. Potentiometer R5 provides the photocell sensitivity adjustment and turning of knob 10 in one direction will move wiper 135 along potentiometer R5 with an upward movement providing a higher voltage to resistor R6 and turning of knob 10 in the other direction will lower the position of wiper 135 providing a lower voltage. When a reflected signal is received by base current limiting resistor R6, a voltage is applied to the anode of diode D4 which provides a 0.7 volt cut-off for transistor Q4, and when the signal is above 0.7 volts DC, transistor Q4 will conduct at the 200 Hz frequency. Capacitor C1 will pass the 200 hz frequency, but block DC voltage, so that ambient light on transistor Q3 will not provide a false signal. Thus, an alternating voltage will be applied to pin 2 of section Z2a. Capacitor C2 and resistance R9 provide an operating feedback network for section Z2a.

The output at pin 4 of section Z2a is applied to pin 9 of section Z1c. Whenever, due to turning of the steering wheel, the incidence of beam 49 from LED 1 makes a transition from a reflective band 40 to a non-reflective band 42 or from a non-reflective band 42 to a reflective band 40, D1 or D2 will conduct, discharging a positive charge from C5 through respectively Z1d or Z1f to ground 130.

Capacitor C3 and resistance R11 form a time constant circuit that determines the discharge time through section Z1d and capacitor C4 and resistor R10 form a time constant circuit which determines the discharge time of section Z1f. When either section Z1d or Z1f is in a discharge mode, capacitor C5 will be discharged.

The positive plate of capacitor C5 is charged through amplifier section Z2b from line 124 through resistance R17 depending on the relative voltages at pins 13 and 8 of section Z2b, pin 8 being connected to the output of speed transducer 60. Thus, the rate of charging of capacitor C5 is dependent upon the vehicle speed, with the higher speed resulting in a higher charging rate.

Speed transducer 60 generates a DC voltage proportional to its rotational speed, and with the transducer shown, approximately 3 volts DC is generated at a vehicle speed of 60 miles per hour. This voltage is applied to pin 8 of section Z2b and since pin 13 of section Z2b is connected through resistance R17 to 12 volt line 124, thus being reverse connected from the other sections, the output at pin 9 of section Z2b will be proportional to the vehicle speed, thus variably charging the positive plate of capacitor C5. The output of transducer 60 is also applied across potentiometer R21 to provide a voltage at wiper 144 through resistor R20 to pin 12 of differential amplifier section Z2c. A positive voltage is applied to pin 11 of section Z2c and resistors R19 and R20 are sized so that, depending on the setting of wiper 144 on potentiometer R21, unless the vehicle speed is sufficient to generate a voltage at pin 12 greater than that at pin 11, the cathode of diode D3 will be grounded through section Z2c causing discharge of capacitor C5, which, as will be explained, will prevent alarm 98 from operating. Also, the signal at pin 9 of section Z2b is discharged through pin 10 of section Z2c when pin 10 is grounded. Turning of knob 104 in one direction will cause upward movement of wiper 144 on potentiometer R21 will cause the system to become disabled at a higher vehicle speed and turning of knob 104 in the other direction will cause downward movement and will cause the system to become disabled at a lower vehicle speed, with the range of speed adjustment typically being 0-55 miles per hour. When the system is enabled or operative, and section Z2c is "off" so that the cathode of diode D3, is not grounded, a positive voltage appears at the anode of LED 2 illuminating that diode and signaling to the operator that the system is enabled and in operation. As explained, LED 2 appears on console 72 in the operator compartment. It is to be understood that the system will be vehicle speed responsive regardless of the setting of wiper 144 due to the provision of the charging of capacitor C5 by section Z2b.

Assuming that steering corrections are not made within a predetermined time period, and assuming that vehicle speed is above that needed to make the system operative, then a positive voltage will build on the positive plate of capacitor C5 resulting in a positive voltage across resistor R27 to pin 1 of differential amplifier section Z2d. Pin 6 of section Z2d has applied thereto a variable voltage, depending upon the position of wiper 152 on potentiometer R24. Wiper 152 is moved upwardly on rotation of knob 84 in one direction to decrease the delay time between transitions caused by movement of the steering wheel to sound alarm 98 and is moved downwardly on rotation in the other direction of knob 84 to increase the delay time between transition which will sound alarm 98. Typically, the component values are chosen so as to vary the delay time between one and six seconds between transitions to sound alarm 98.

When the charge on the positive plate of capacitor C5 is sufficient to place a voltage at pin 1 of Z2d that exceeds that voltage at pin 6 of Z2d, voltage at output pin of Z2d, will switch from a low near ground potential to a high positive causing transistor Q5 to conduct a sounding alarm 98.

Test switch SW1, which is operated by button 92 in console 72, connects resistor R28 through terminals 156 and 158 when switch SW1 is closed to 12 volt line 124 causing alarm 98 to sound regardless of the voltage at pin 6 on segment Z2d, thus providing a test circuit to assure the operator that alarm 98 is operative.

Figure 7:
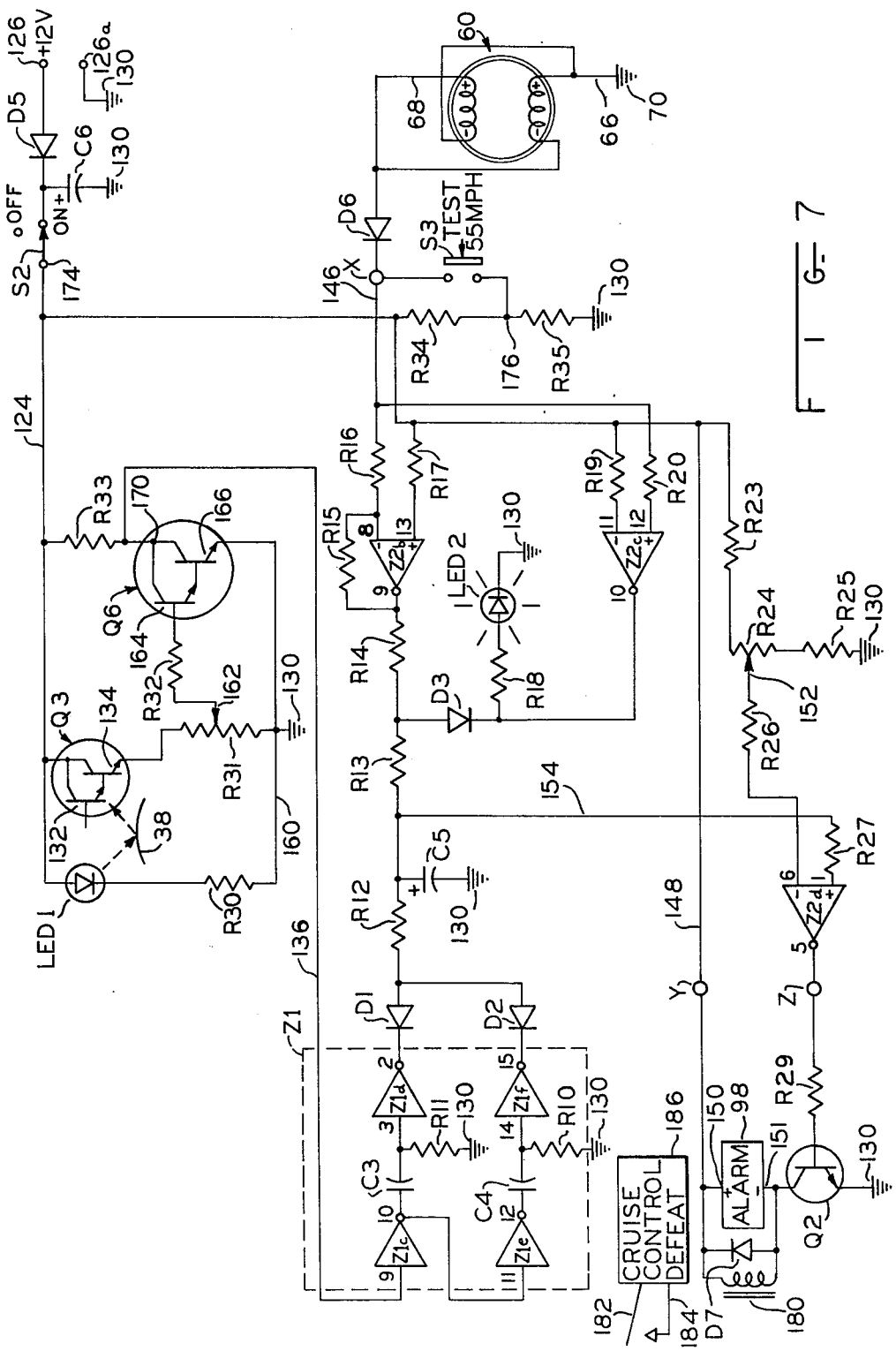
FIG. 7 is a schematic, partially block diagram of a second preferred embodiment.

Referring to the circuit diagram of FIG. 7, a second embodiment is shown which is generally similar in circuit configuration and function to the circuit diagram of FIG. 6 but with certain functions deleted and other functions added. In the circuit of FIG. 7, comparable components to those in the circuit of FIG. 6 will be designated with comparable reference numerals. In the circuit of FIG. 7, hex inverter sections Z1a and Z1b are not used in hex inverter Z1, and section Z2a in quad-differential amplifier Z2 is not used. The remaining sections in hex inverter Z1, sections Z1c, Z1d, Z1e, and Z1f and the remaining sections Z2b, Z2c, and Z2d in quad-differential amplifier Z2 are connected and used as in the circuit for FIG. 6. Also, resistances R10, R11, R12, R13, R14, R15, R16, R17, R18, R19, R20, R23, R24, R25, R26, R27, and R29 are connected in the circuit and function in the manner described for the circuit of FIG. 6. In addition, capacitors C3, C4, C5, and C6 are connected and function in the manner described for the circuit of FIG. 6. LED 1, photo-Darlington transistor or cell Q3, and speed transducer 60, while not connected in the manner of the circuit of FIG. 6, function in a similar manner as will now be described.

The embodiment of FIG. 7 does not have the 200 Hz free running multi-vibrator, but instead has the anode of LED 1 connected through switch S2 and diode D5 to 12 volt D.C. power supply terminal 126. Supply terminal 126a is connected to ground 130. Diode D5 is poled so that reverse polarity on the power supply leads will not damage the circuit of FIG. 7. Photo-Darlington cell Q3 has transistors 132 and 134 coupled in Darlington configuration with the common connection between the collectors of transistors 132 and 134 connected through the potentiometer R31 to ground line 160 which is coupled to ground 130. The cathode of LED 1 is coupled through resistor R30 to line 160. LED 1 focuses a spot of red light on strip 38 with the reflections therefrom being sensed by cell Q3 as described for the embodiment of FIG. 6.

Slide 162 is manually adjustable along resistance R31 to calibrate cell Q3 and is coupled through resistance R32 to the base of transistor 164 which is coupled in Darlington configuration to transistor 166 in cell Q3. The common connection between the collectors of transistors 164, 166 is coupled through resistance R33 to line 124 and the emitter of transistor 166 is coupled to ground line 160. The common collector connection 170 is also coupled to hex inverter Z1 pin 9, which is the input to selection Z1c.

The pole terminal of SPST (single pole single throw) switch S2 is coupled through voltage divider resistances R34, R35 to ground 130 and test button switch S3 is coupled between line 146 and connection point 176 between resistors R34, R35. Diode D6 has its cathode connected to connection point X and its anode connected to line 68 of speed transducer 60. Diode D6 has approximately a 0.7 voltage drop thereacross, and will not conduct until the output of transducer 60 is at a voltage level which corresponds to a vehicle speed of about fifteen miles per hour so that diode D6 will prevent system functioning at vehicle speeds less than fifteen miles per hour. Diode D6 also isolates speed transducer 60 from the test switch voltage, next described.

The connection point 176 between voltage divider resistors R34, R35 is at approximately 3 volts DC which corresponds to a vehicle speed of about 55-60 miles per hour so that when the operator depresses the button of switch S3 to complete a circuit between point 176 and line 146, a vehicle speed of 55-60 is simulated, even while the vehicle is stationary, to provide a test function for the circuit by applying a voltage corresponding to 55-60 mph to pin 8 of quad-differential Z2 through resistance R16.

Diode D7 is coupled across alarm 98, the anode being connected to terminal 151 and the cathode being connected to terminal 150, and relay 180 is coupled across diode D7. Relay contacts 182, 184 are closed on actuation of relay 180 and are shown coupled to cruise control defeat circuit 186, so that simultaneously with the actuation of alarm 98, relay 180 is energized closing contacts 182, 184 to actuate circuit 186 to defeat a cruise control circuit, not shown, but which is conventionally used to maintain a vehicle speed at a preset level. An automatic defeat of many cruise control setting will be effected upon actuation of alarm 198, increasing the safety function of this invention. Relay 180 can also control other automobile circuits including an external alarm to warn other motorists of driver incapacity.

In the operation of the circuit of FIG. 7, LED 1 focuses a spot of light on the strip 38 of alternate bands of reflective and non-reflective material, the reflections being sensed by cell Q3. As mentioned, LED 1 and cell Q3 are positioned on the steering column while strip 38 is affixed to the steering wheel hub 44. Upon a transition from non-reflection to reflection from strip 38, cell Q3 is caused to conduct raising the potential at slide 162 which is positioned for proper cross-calibration of cell Q3 and transistor Q6, causing transistor Q6 to conduct, sharply lowering the potential on line 136, which is connected to common junction 170, and provides a discharge path for capacitor C5 as previously explained for the circuit of FIG. 6.

When a non-reflective band on strip 38 is in the path of the light spot from LED 1, there is no reflection to cell Q3 so that it is non-conductive and the potential at slide 162 is substantially at ground and transistor Q6 is nonconductive, raising the potential at junction 170 and on line 136, again providing a discharge path for capacitor C5 during the transition from a reflected to non-reflected condition in the manner described for the embodiment of FIG. 6. The operation thus described is similar to the operation for the embodiment of FIG. 6 with the exception that there is no 200 Hz signal impressed on LED 1.

With switch S2 in the "on" position, as shown, approximately 12 volts DC is placed across voltage divider resistances R34 and R35 with connection point 176 being at approximately 3 volts. Upon closing switch S3, the 3 volt potential at point 176, which corresponds to approximately 55-60 mph vehicle speed, is placed on line 146 and will cause charging of capacitor C5 in the manner described for the embodiment of FIG. 6, causing a positive potential on the base of transistor Q2 and energization of alarm 98, also as described in the manner for the embodiment of FIG. 6. Thus, a test circuit function is provided which simulates a predetermined vehicle speed even though the vehicle is stationary.

Figure 8:
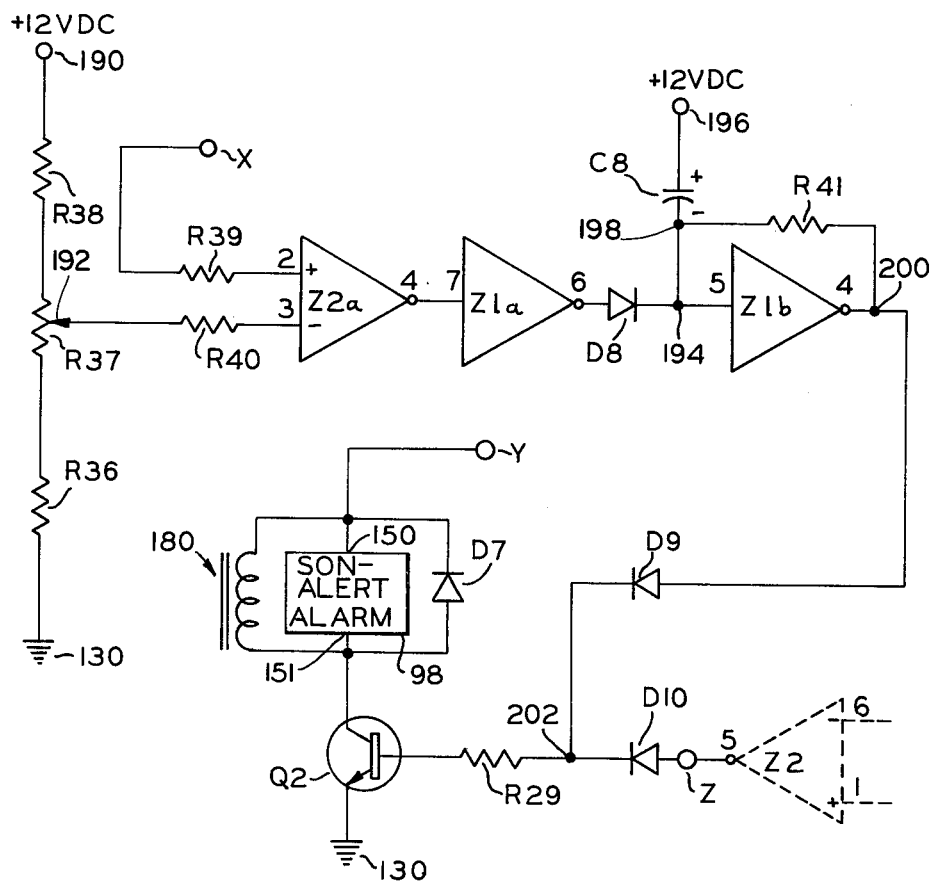
FIG. 8 is a schematic partially block diagram for use with the embodiments of FIGS. 6 or 7 which provides a warning signal when a preset vehicle speed is exceeded.

Referring to FIG. 8, a circuit is shown which may be connected at points X, Y, and Z to the circuit of FIG. 7 and replaces that circuitry to the left of connection points Y, Z in the circuit of FIG. 7 to provide an alarm when a preset vehicle speed is exceeded, in addition to providing the alarm for driver incapacity as previously described for the circuit of FIG. 7. Voltage divider resistors R36, R37, and R38 are connected in series between plus 12 volt terminal 190 and ground 130. A slide 192, manually adjustable, is coupled through resistance R40 to pin 3 of quad-differential amplifiers Z2, which is the minus input to section Z2a. Junction X is coupled through resistor R39 to pin 2 of amplifier Z2, which is the plus input to section Z2a. The output of section Z2a, pin 4 of amplifier Z2, is connected to pin 7 of hex inverter Z1 which is the input to section Z1a, the output of which is pin 6 of inverter Z1 and is connected to the anode of diode D8. The cathode of diode D8 is connected to junction point 194, which is coupled through capacitor C8 to 12 volt DC terminal 196 and is coupled to pin 5 of hex inverter Z1 which is the input to section Z1b, the output of which is pin 4 of inverter Z1 and is connected to the anode of diode D9, the cathode of which is connected to junction point 202. Resistor R41 is connected across section Z1b at junction points 198 and 200. Connection point Z is coupled to the anode of diode D10, the cathode of which is connected to junction point 202 and through resistor R29 to the base of transistor Q2, the emitter of which is connected to ground 130 and the collector of which is connected to terminal 151 of alarm 98 as described for the circuit of FIG. 7. Junction point Y is connected to terminal 150 of alarm 98.

In the operation of the circuit in FIG. 8, slide 192 is set to correspond to a vehicle speed above which transducer 60 will generate sufficient voltage to place pin 2 of quad-differential amplifier Z2 at a voltage that will exceed that at pin 3, causing the normally low output at pin 4, the output of section Z2a, to go high. This raises the input of amplifier section Z1a to a high changing its output from normally high to low, causing diode D8 to be non-conductive. This changes the normally high input to section Z1b, pin 5 of hex inverter Z1, to a low input and the output of section Z1b, pin 4 goes from normally low to high causing the output across section Z1b to oscillate at a frequency determined by the values of capacitor C8, resistor R41, and the internal resistance of section Z1b. A typical duty cycle for the oscillations are the result of the feedback connection of resistance R41 between the output and input of section Z1b and the alternate charging and discharging of capacitor C8.

The high state of the oscillations bias diode D9 to conduction, and are blocked by diode D10 from feeding back into the circuitry of FIG. 7, and raise the base of transistor Q2 to conduction. Thus, alarm 98 is caused to sound intermittently when the preset vehicle speed is exceeded, warning the driver with a characteristic intermittent "beep" that his speed is excessive.

In alternative embodiments, the alarm trip signal can be used to de-energize auto cruise control, sound horn, or otherwise control automobile circuits for safety. Also, miles per gallon meter, digital speed indicators, digital time, and similar additions can be incorporated with this invention. A satisfactory working embodiment has component values as indicated below:

COMPONENT LISTING

Integrated Circuits
Z1=4049-c-MOS Hex inverter (Motorola)
Z2=LM 3900-c-MOS Quad differential amp. (Motorola)
Transistors
Q1=2N4123
Q2=2N5450
Q3=2N577 (Photo-Darlington)
Q4=2N4123
Q5=2N5450
Q6=2N5305
Diodes
D1, D2, D3, D4, D5, D6, D7, D8, D9, D10=1N914
Resistors

| | | |
|---|---|---|
| R1 = 1 Meg | R14 = 680 K | R28 = 1 Meg |
| R2 = 100 K | R15 = 10 Meg | R29 = 1 K |
| R3 = 1 K | R16 = 5.6 Meg | R30 = 220 |
| R4 = 100 1/Watt | R17 = 10 Meg | R31 = 1 K |
| R5 = 500K Pot | R18 = 1500 OHM | R32 = 47K |
| R6 = 47K | R19 = 22 Meg | R33 = 22K |
| R7 = 22K | R20 = 390 K | R34 = 30K |
| R8 = 47K | R21 = 5K Pot | R35 = 10K |
| R9 = 10 Meg | R22 = 1500 OHM | R36 = 18K |
| R10 = 2.2 Meg | R23 - 10K | R37 = 50K |
| R11 = 2.2 Meg | R24 = 50K Pot | R38 = 150K |
| R12 = 10 | R25 = 47K Pot | R39 = 1 Meg |
| R13 = 100 K | R26 = 3.3 Meg | R40 = 3.3 Meg |
| | R27 = 1 Meg | R41 = 1 Meg |

Capacitors

| | |
|---|---|
| C1 = .02 MFD | C5 = 10 MFD / 25 VDC |
| C2 = .005 MFD Disc | C6 = 50 JFD / 25 VDC |
| C3 = .02 MFD Disc | C7 = .02 MFD Disc |
| C4 = .02 MFD Disc | C8 = 2.2 MFD |

Alarm 98
Sonalert Alarm
Switch SW1
SPST N.O. push button
Speed Transducer 60
SpaceKom
Permanent magnet D.C. motor While there have been described above the principles of this invention in connection with specific apparatus, it is to be clearly understood that this description is made only by way of example and not as a limitation to the scope of the invention.

What is claimed is:

1. A vehicle having a steering sensing apparatus comprising:

steering sensor means for sensing a predetermined steering movement and emitting a first signal upon such movement;

vehicle speed sensing means for sensing vehicle speed and emitting a second signal proportional to vehicle speed;

alarm means electrically coupled to said steering sensor means and said vehicle speed sensing means and responsive to said first and second signals for generating an alarm signal upon the absence of said first signal for a predetermined time period, said predetermined time period being changed in time duration in response to said second signal whereby the alarm signal is generated in accordance with steering movement and in accordance with said second signal which is continuously changed by instantaneous vehicle speed; and means for manually varying said predetermined time period.

2. The apparatus of claim 1 including means for disabling said second signal when said vehicle speed is below a predetermined level thereby disabling said alarm means.

3. The apparatus of claim 2 including means for adjustably varying said predetermined level below which said second signal is disabled.

4. The apparatus of claim 1 wherein said vehicle speed sensing means is coupled between the vehicle speedometer cable and the vehicle speedometer needle.

5. The apparatus of claim 1 wherein said steering sensor means comprises means for detecting steering movement mounted between the vehicle steering wheel and the vehicle steering column adjacent said steering wheel.

6. The apparatus of claim 1 wherein said second signal is continuously changed in amplitude by instantaneous vehicle speed.

7. The apparatus of claim 1 including control means electrically coupled to said vehicle speed sensing means and said alarm means and responsive to said second signal for generating a control signal when the vehicle speed exceeds a predetermined speed; said alarm means being responsive to said control signal when said vehicle speed exceeds a predetermined speed to generate a second alarm signal.

8. The apparatus of claim 7 including means for manually adjusting said predetermined speed.

9. The apparatus of claim 7 wherein said second alarm signal is perceptibly distinguishable from the first mentioned alarm signal.

10. The apparatus of claim 9 wherein said control means comprises an inverting amplifier having an input and an output;

a resistance being coupled between said input and output;

a capacitance being coupled between said input and a D.C. power supply;

a transistor having a base, emitter, and a collector;

a diode being coupled between said amplifier output and said base;

said alarm means comprising an alarm coupled in the transistor emitter-collector circuit; said resistance and capacitance causing said inverting amplifier to operate intermittently upon generation of said second alarm signal, causing said transistor to conduct intermittently and said alarm to be actuated intermittently.

11. The apparatus of claim 1 including a cruise control defeat circuit means coupled to said alarm means and responsive to said alarm signal to free the vehicle from automatic speed control.

12. Apparatus for use in a vehicle having a manually operated steering wheel having a hub rotatably mounted on a steering column for vehicle steering comprising:

steering sensing means for sensing a predetermined manual steering movement and emitting a signal upon such movement;

alarm means electrically coupled to said steering sensing means and responsive to said signal for generating an alarm upon absence of said signal for a predetermined time period:

said steering sensor means comprising first means for generating a radiant energy beam, said first means being mounted on one of the steering column and steering wheel;

second means for reflecting said beam, said second means being mounted on the other of said wheel and column;

third means for receiving said reflected beam, said third means being mounted on said one of said steering column and steering wheel;

said second means comprising an elongated strip wrapped about the periphery of one of said steering column and steering wheel hub whereby said strip is rotated relatively between said column and steering wheel hub on steering wheel rotation to provide an obstruction free mounting of said strip and to prevent hazardous impairment of relative movement between said column and said hub;

said strip having alternate transverse bands of reflective and non-reflective surfaces;

a housing mounted to the other of said steering column and hub and having a portion overlying and spaced from said strip;

said first and third means being positioned in said housing in said portion, said light emitting member being positioned to direct a light beam towards said strip and said light responsive member being positioned to receive said beam after reflection from said strip.

13. The apparatus of claim 12 including fourth means coupled to said third means and responsive to said reflected signal to emit a signal on each transition of the reflected beam from a reflective band to a non-reflective band and from a non-reflective band to a reflective band.

14. Apparatus for use in a vehicle having a manually operated steering wheel having a hub rotatably mounted on a steering column for vehicle steering comprising:

steering sensing means for sensing a predetermined manual steering movement and emitting a signal upon such movement;

alarm means electrically coupled to said steering sensing means and responsive to said signal for generating an alarm upon absence of said signal for a predetermined time period:

said steering sensor means comprising first means for generating a radiant energy beam, said first means being mounted on one of the steering column and steering wheel;

second means for reflecting said beam, said second means being mounted on the other of said wheel and column;

third means for receiving said reflected beam, said third means being mounted on said one of said steering column and steering wheel;

said second means comprising a reflective member mounted on one of said steering column and steering wheel hub;

a housing mounted to the other of said steering column and hub and having a portion overlying and spaced from said reflective member;

said first and third means being positioned in said housing in said portion, said light emitting member being positioned to direct a light beam towards said member and said light responsive member being positioned to receive said beam after reflection from said member;

said first means comprising means for minimizing ambient liff affects by impressing an alternating current signal having a predetermined frequency on said beam, said third means comprising means for responding only to said predetermined frequency whereby the affect of ambient light is minimized.

15. The apparatus of claim 14 wherein said predetermined frequency is 200 Hz.

* * * * *

UNITED STATES PATENT AND TRADEMARK OFFICE
CERTIFICATE OF CORRECTION

PATENT NO. : 4,278,969
DATED : July 14, 1981
INVENTOR(S) : Richard E. Woods

It is certified that error appears in the above—identified patent and that said Letters Patent is hereby corrected as shown below:

Col. 1, 1. 31, for "drive" read --driver--.
Col. 3, 1. 13, for "acutated" read --actuated--.
Col. 3, 1. 50, after "applied" insert --to--.
Col. 3, 1. 62, for "48" read --49--.
Col. 5, 1. 40, for "MOS" read --Motorola--.
Col. 5, 1. 66, after "connected" insert --to--.
Col. 6, 1. 28, delete "Z2", second occurrence.
Col. 9, 1. 25, after "55-60" insert --mph--.
Col. 11, 1. 47, for "JFD" read --MFD--.
Col. 14, 1. 13, for "," read --;--.
Col. 14, 1. 37, for "liff" read --light--.

Signed and Sealed this

Third Day of May 1983

[SEAL]

Attest:

Attesting Officer

GERALD J. MOSSINGHOFF

Commissioner of Patents and Trademarks